July 18, 1961  R. S. HAWLEY ET AL  2,992,670
COMPOSITE LAMINATED STRUCTURES
Filed Jan. 30, 1959
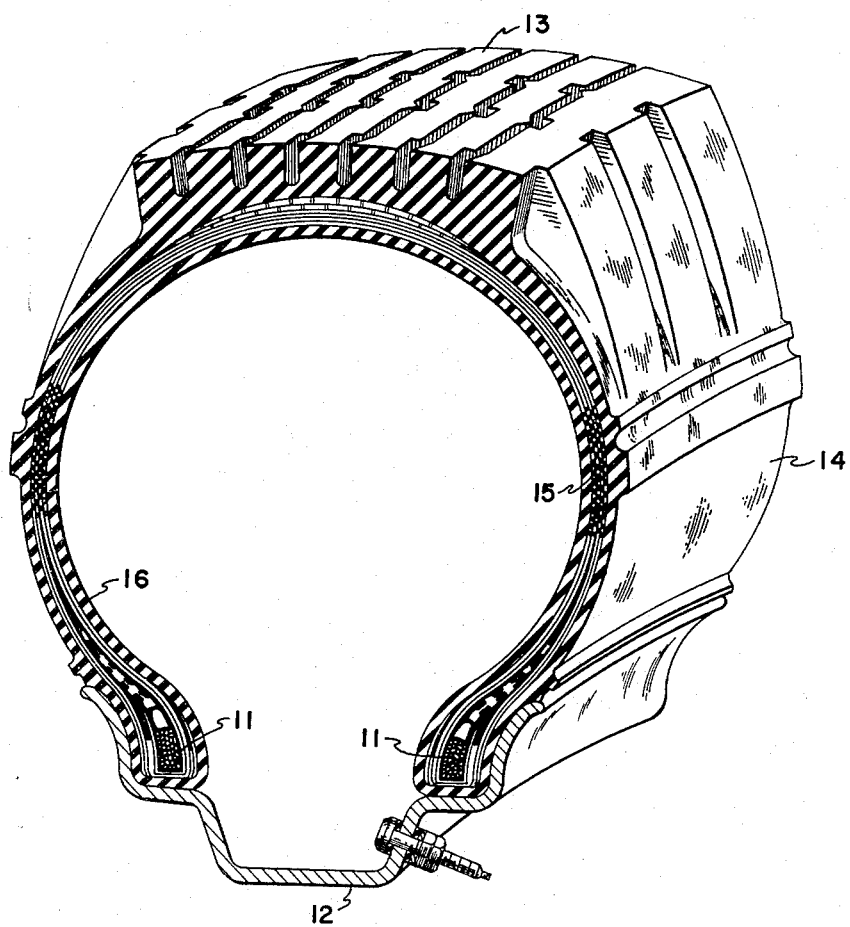
Roger S. Hawley
Robert E. Clayton   Inventors
By *H. A. Pattison Jr.* Attorney

United States Patent Office 2,992,670
Patented July 18, 1961

2,992,670
COMPOSITE LAMINATED STRUCTURES
Roger S. Hawley, Cranford, and Robert E. Clayton, Roselle Park, N.J., assignors to Esso Research and Engineering Company, a corporation of Delaware
Filed Jan. 30, 1959, Ser. No. 790,095
13 Claims. (Cl. 152—330)

This invention relates to composite laminated structures and, more particularly, to tires including a carcass containing a high unsaturation rubber and a white or pastel colored sidewall containing a blend of chlorinated and brominated butyl rubber.

It is known that it would be desirable to have tires including a carcass containing at least one highly unsaturated rubber and a white or pastel colored sidewall containing butyl rubber. This is because such a carcass exhibits superior adhesion of nylon tire cords to the rubber matrix in which they are embedded and the light-colored butyl rubber sidewall exhibits outstanding resistance to weathering and cracking. However, butyl rubber does not adhere strongly to the highly unsaturated rubber or rubbers in the carcass.

In accordance with the present invention, it has now been discovered that a light-colored sidewall containing a blend of a major proportion of chlorinated butyl rubber and a minor proportion of brominated butyl rubber adheres to a highly unsaturated carcass more strongly, at both normal and elevated temperatures, than does unmodified butyl rubber, chlorinated butyl rubber, or brominated butyl rubber alone. Heretofore, brominated butyl rubber sidewalls have not been suitable because of poor scorch resistance and chlorinated butyl rubber sidewalls have not been suitable because of poor adhesion at elevated temperatures. Surprisingly, the sidewalls of the present invention, containing the aforementioned blend of halogenated butyl rubbers have neither of these last-mentioned disadvantages and in fact exhibit synergistically better adhesion properties than either chlorinated or brominated butyl rubber alone.

The invention will become more apparent from the following description when read in conjunction with the accompanying drawing wherein the single figure is a cross-sectional view in perspective of a pneumatic tire including a light-colored sidewall containing a blend of chlorinated and brominated butyl rubber in accordance with the instant invention.

In practicing the present invention, there is compounded together about 50–90 parts by weight, preferably about 70–85 parts by weight of chlorinated butyl rubber, about 10–50 parts by weight, preferably about 15–30 parts by weight of brominated butyl rubber, about 0.1–100 parts by weight, preferably about 1 to 80 parts by weight of CaO, MgO and/or especially ZnO and about 0.05–5.0 parts by weight, preferably about 0.1–3.0 parts by weight of an ultra-accelerator such as a thiocarbamate and/or especially a thiuram sulfide such as tetramethyl thiuram disulfide or the like. The compounded stock formed is then applied to the carcass, such as a carcass containing a blend of natural and GR-S rubber, and cured for 0.1 to 100 minutes, preferably for 1 to 60 minutes at about 200° to 450° F., preferably at about 250° to 400° F.

It is especially preferred to employ, per 100 parts by weight of total halogenated butyl rubber, the foregoing materials wherein both ZnO and CaO (and/or MgO) are present, the ZnO being in an amount of about 2 to 100, preferably 3–80 parts by weight and the CaO and/or MgO being present in an amount of about 0.1 to 25, preferably about 0.5 to 10.0 parts by weight. It is also preferred to use about 0.5–150, preferably 5–100 parts by weight of a light-colored filler or fillers such as $H_2O \cdot 3MgO \cdot 4SiO_2$ (talc) and/or especially $TiO_2$, about 0.1 to 15, preferably about 0.5 to 10 parts by weight of sulfur, about 0.05–5.0, preferably about 0.2–3.0 parts by weight of a thiazl sulfide such as benzothiazyl disulfide, about 0.01 to 3.0, preferably about 0.05 to 1.0 part by weight of a bluing agent such as ultramarine blue and about 0.05 to 5.0, preferably about 0.2 to 3.0 parts by weight of a mold release agent such as stearic acid. It is also preferred to employ an admixture of about 5 to 100, preferably about 10 to 75, parts by weight of the $TiO_2$ together with about 5 to 100, preferably about 10 to 75, parts by weight of the talc.

Butyl rubber is a vulcanizable rubbery hydrocarbon copolymer containing about 85 to 99.5%, preferably 95–99.5% of a $C_4$–$C_8$ isoolefin such as 2-methyl-1-butene, 3-methyl-1-butene, or especially isobutylene, the remainder being a $C_4$–$C_{14}$ multiolefin such as dimethallyl, myrcene or vinyl fulvenes, preferably a $C_4$ to $C_6$ conjugated diolefin such as butadiene, dimethyl butadiene, piperylene or especially isoprene. The resulting copolymer, generally has a Staudinger molecular weight of about 20,000 to 150,000 and an iodine number of about 0.5 to 50.0 (Wijs). The preparation of butyl-type rubbers is described in U.S. Patent 2,356,128 to Thomas et al. and also in other patents as well as in literature.

Brominated butyl rubber is produced by reacting the unvulcanized rubber copolymer with bromine or other suitable bromine-containing compounds so that the polymer contains a bromine content of at least about 0.5 weight percent bromine but not more than a bromine content of about 3 atoms per molecule of multiolefin present in the copolymer; i.e., a bromine content of not more than about 3 atoms of bromine per double bond in the copolymer. Typical brominating agents which may be employed are molecular bromine, sodium hypobromite, sulfur bromide, N-bromosuccinimide, hydrogen bromide, tri-bromophenol bromide, N-bromoacetamide, N, N'-dibromo-5,5 dimethyl hydantoin and other common brominating agents. The preferred brominating agents are molecular bromine or such bromine compounds as N-bromosuccinimide, beta-bromoethyl phthalimide, N-bromoacetamide, bromo-hydantoins, etc. The bromination is advantageously conducted at about —50° C. to about +150° C., preferably at about 20° to 60° C. for about one minute to several hours. However, the temperatures and times are regulated to brominate the rubbery copolymer to the extent above-mentioned.

The bromination may be accomplished in various ways. One process comprises preparing a solution of the hydrocarbon copolymer as above, in a suitable unreactive organic solvent such as heptane, kerosene, toluene, chlorobenzene, trichloroethane, etc., and adding thereto gaseous or preferably liquid bromine or other brominating agent, optionally in solution, such as dissolved in methyl chloride, a carbon tetrahalide etc. Another method resides in blending with the solid copolymer a solid brominating agent which is known to lead to allylic substitution such as N-bromo-succinimide or the like supra. In such a case, the blend formed is preferably mill-mixed and advantageously heated to a temperature sufficient to brominate the solid copolymer. The use of elevated or depressed pressures is optional since atmospheric pressure is satisfactory. However, the pressure may vary, depending upon the foregoing temperatures and reaction times from about 1 to 400 p.s.i.a.

Chlorinated butyl rubber is produced by mild chlorination of the unvulcanized hydrocarbon copolymer in a manner which does not appreciably degrade the molecular weight thereof, but sufficiently to produce a rubber which retains its tensile strength upon heat-aging. The chlorination is preferably carried out so as to make the resultant chlorinated butyl rubber contain about at least 0.5 weight percent (preferably at least about 1.0 weight percent) combined chlorine, but not more than about "X" weight percent combined chlorine wherein:

$$X = \frac{35.46L}{(100-L)M_1 + L(M_2+35.46)} \times 100$$

and:

$L$=mole percent of the multiolefin in the polymer
$M_1$=molecular weight of the isoolefin
$M_2$=molecular weight of the multiolefin
$35.46$=atomic weight of chlorine Restated, there should be at least about 0.5 weight percent of combined chlorine in the polymer but not more than about 1 atom of chlorine combined in the polymer per molecule of multiolefin present therein; i.e., not more than about one atom of combined chlorine per double bond in the polymer. The maximum mole percent of combined chlorine is generally about 0.25–0.80 times the mole percent unsaturation of the polymer. Normally the chlorine content of chlorinated copolymers containing up to about 15% combined multiolefin should be within about 0.1 to 10.0% chlorine preferably about 0.5 to 3.0% chlorine based on the total weight of rubbery copolymer.

Suitable chlorinating agents which may be employed are chlorine, alkali metal hypochlorites, oxygenated sulfur chlorides, pyridinium chloride perchloride, iodine monochloride, alpha-chloroacetoacetanilide, hydrogen, chloride, beta-chloro-methyl phthalimide, and other common chlorinating agents. The preferred chlorinating agents are molecular chlorine, N-chlorosuccinimide, chloro-hydantoins and sulfuryl chloride. The chlorination is conducted at temperatures of about −50° C. to about +150° C. and preferably at about 20° to 60° C. for about one minute to several hours. However, the temperatures and times are regulated to chlorinate the rubbery copolymer to the extent above-mentioned.

The chlorination is preferably accomplished by preparing a solution of the above rubbery copolymer in an inert liquid solvent such as an inert hydrocarbon or advantageously halogenated derivatives of saturated hydrocarbons, examples of which are hexane, naphtha, mineral spirits, benzene, chloroform, carbon tetrachloride, etc., and adding thereto chlorine or other chlorinating agent, optionally in solution, such as dissolved in an alkyl chloride, carbon tetrachloride, etc. The use of elevated or depressed pressures is optional since atmospheric pressure is satisfactory although the pressure may vary, depending upon the foregoing temperatures and times from about 1 to 400 p.s.i.a.

The concentration of the butyl rubber in the solvent will depend upon the type of reactor, molecular weight of the butyl rubber, etc. In general, the concentration of a butyl rubber having a viscosity average molecular weight of about 100,000 to about 800,000, if the solvent is a substantially inert hydrocarbon, will be between about 1 and 80% by weight, preferably about 5 to 60%.

When chlorinating butyl rubber with gaseous chlorine, the chlorine gas may also be diluted with up to about 20 times its volume, preferably about 0.1 to 5.0 times its volume of an inert gas such as nitrogen, methane, ethane, carbon dioxide, etc. In chlorinating the butyl rubber with gaseous chlorine in batch procedure, the chlorine is preferably added relatively slowly to a preformed solution of the butyl rubber with agitation. The chlorine is advantageously added over a period of about 1 to 20 minutes depending upon the degree of agitation. The amount of gaseous chlorine added to a butyl rubber copolymer dissolved in a completely inert hydrocarbon is approximately twice that which is desired to be combined with the butyl polymer, since for one mole of chlorine, one chlorine atom combined with the polymer essentially by replacing a hydrogen atom from said polymer and the other atom is evolved as hydrogen chloride.

The chlorinated copolymer formed advantageously has a viscosity average molecular weight between about 250,000 and 2,000,000 and a mole percent unsaturation between about 0.2 to 20.0, advantageously about 0.4 to 10.0 and preferably about 0.6 to 3.0. This copolymer, when cured, has good to excellent tensile strength, extension modulus, abrasion resistance, elongation and flexure resistance and outstanding gas impermeability and heat aging properties.

Referring now to the drawing, the single figure depicts a pneumatic tubeless tire which comprises a hollow toroidal type member which is substantially U shaped in cross section by virtue of an open portion which extends around the inner periphery of the member. In other words, the tire is of a tubeless type structure which has a cross-section in the form of an open-bellied body with spaced terminal portions to define a member generally resembling a horseshoe. The terminal portions constitute bead portions 11—11 of the tire inside of which are a plurality of bead wires, imbedded and molded in a rubber. The outer surfaces of the bead portions and/or rim 12 are advantageously formed into an air-sealing means, such as a plurality of ribs to aid in the formation of a gas tight seal between the bead portions and the rim when the tire is inflated. The outer surface of the tire also includes tread area 13 and sidewalls 14. Sidewalls 14, in accordance with the present invention, contain an admixture of a major proportion of chlorinated butyl rubber and a minor proportion of brominated butyl rubber. The open portion of the horseshoe-shaped tire faces that portion of the inner circumference of the tire which is adjacent the said tread area 13 of the tire.

The layer next adjacent the outer layer comprises a carcass 15 which includes a high unsaturation rubber or rubbers, preferably a blend of natural and GR–S rubber, having incorporated therein a fabric composed of a plurality of cotton, rayon, nylon, and/or steel cords. The tire also includes an inner lining 16 made from rubber which has been at least partially vulcanized and preferably substantially completely vulcanized for about 1 to 60 or 100 minutes at temperatures between about 200° and 450° F. This inner lining must be substantially impermeable to air. The above multi-layers, at least three in number, are adhered together by vulcanizing to form a tire of a unitary structure.

In order to more fully illustrate the present invention, the following experimental data are given:

*Example 1*

100 parts by weight of chlorinated butyl rubber, 100 parts by weight of brominated butyl rubber or a blend of 80 parts by weight of chlorinated butyl rubber and 20 parts by weight of brominated butyl rubber (in accordance with the presence invention) were each compounded with 2.0 parts by weight of MgO, 80 parts by weight of talc ($MgSiO_3$), 40 parts by weight of $TiO_2$, 1.0 part by weight of stearic acid, 0.2 part by weight of ultramarine blue, 2.3 parts by weight of sulfur, 0.4 part by weight of tetramethyl thiuram disulfide, 1.25 parts by weight of benzothiazyl disulfide and 70 parts by weight of zinc oxide.

The data is summarized hereinafter wherein the chlorinated butyl rubber contained 1.20 weight percent combined chlorine and had an 8 minute Mooney viscosity at 212° F. of 71, the mole percent unsaturation being 1.47. The brominated butyl rubber used contained 3.3 weight percent combined bromine and had an 8 minute Mooney viscosity at 212° F. of 60, the mole percent unsaturation being 1.50. The inspections were as follows:

|  | Sample A | Sample B | Sample C (of the invention) |
|---|---|---|---|
| Component: |  |  |  |
| Chlorinated butyl rubber parts by weight | 100 |  | 80 |
| Brominated butyl rubber do |  | 100 | 20 |
| Mooney scorch at 260° F. (min. for 5 point rise, small rotor) | 22 | 4 | 24 |
| Adhesion to Vanderbilt NR-SBR [1] carcass (50-50) cured at 307° F. for 19 minutes, test rate of 2"/min.: |  |  |  |
| Lb./inch at room temperature | 36 | 28 | 40 |
| Lb./inch at 212° F | 6 | 16 | 18 |
| Physical properties (cured for 15 minutes at 307° F.): |  |  |  |
| Tensile strength (p.s.i.) | 1,135 | [2] | 1,500 |
| Elongation, percent | 750 | [2] | 750 |
| 300% modulus (p.s.i.) | 550 | [2] | 725 |
| Hardness, Shore A | 65 | [2] | 70 |
| Appearance | Rough | [2] | Smooth |

[1] NR=natural rubber; SBR=styrene-butadiene rubber.
[2] Could not be tested.

The above data show that the chlorinated butyl rubber sample is unsatisfactory as to adhesion at 212° F. and the brominated butyl rubber sample is unsatisfactory as to Mooney scorch resistance (and, in fact, was not sufficiently processable to have its physical properties tested). On the other hand, Sample C, in accordance with the invention, exhibited a synergistically improved scorch resistance and adhesion to the Vanderbilt carcass which contained a blend of 50% natural rubber and 50% GR-S rubber (20% styrene-80% butadiene).

*Example 2*

The same general procedure as in Example 1 was repeated employing as the amounts of talc, $TiO_2$ and ZnO; 47.0, 47.0 and 20.0 parts by weight respectively with the following results:

|  | Sample D | Sample E (of the invention) |
|---|---|---|
| Component: |  |  |
| Chlorinated butyl rubber parts by weight | 100 | 80 |
| Brominated butyl rubber do |  | 20 |
| Mooney scorch at 260° F. (min. for 5 point rise, small rotor) | 20 | 26 |
| Adhesion to Vanderbilt NR-SBR carcass (50-50) cured at 307° F. for 19 minutes, test rate of 2"/min.: |  |  |
| Lb./inch at room temperature | 41 | 56 |
| Lb./inch at 212° F | 5 | 16 |
| Physical properties (cured at 307° F. for 15 minutes): |  |  |
| Tensile strength (p.s.i.) | 875 | 1,480 |
| Elongation, percent | 950 | 755 |
| 300% modulus (p.s.i.) | 250 | 450 |
| Hardness, Shore A | 54 | 58 |
| Appearance | Rough | Smooth |

The same general comments apply as in Example 1.

*Example 3*

The same general procedure as in Example 1 was repeated varying the amounts of chlorinated butyl rubber and brominated butyl rubber with the following results:

|  | Sample F (of the invention) | Sample G (of the invention) | Sample H (of the invention) | Sample I |
|---|---|---|---|---|
| Component: |  |  |  |  |
| Chlorinated butyl rubber parts by weight | 90 | 70 | 50 | 30 |
| Brominated butyl rubber parts by weight | 10 | 30 | 50 | 70 |
| Mooney scorch at 260° F. (min. for 5 point rise, small rotor) | 16 | 10.0 | 6.5 | 4.2 |
| Adhesion to Vanderbilt NR-SBR carcass (50-50) cured at 307° F. for 19 mins. test rate of 2"/min.: |  |  |  |  |
| Lb./inch at room temp | 30 | 25 | 28 | 23 |
| Lb./inch at 212° F | 13 | 21 | 16 | 9 |

The above data show that excellent results are obtained as to Mooney scorch time and adhesion at both room temperature and at 212° F. using, in accordance with the present invention, 50, 70, and 90 parts by weight of chlorinated butyl rubber blended with 50, 30, and 10 parts by weight respectively of brominated butyl rubber. On the other hand, reversing these ratios, so that there is only 30% chlorinated butyl rubber but 70% of brominated butyl rubber, results in the unsatisfactory Mooney scorch value of only 4.2 minutes and the unsatisfactory adhesion at 212° F. of only 9 pounds.

Resort may be had to modifications and variations of the disclosed embodiments without departing from the spirit of the invention or the scope of the appended claims.

What is claimed is:

1. A laminated structure consisting of a first layer containing a highly unsaturated rubber and a second layer containing a major proportion of chlorinated isoolefin-multiolefin butyl rubber having at least about 0.5 weight percent combined chlorine but not more than about 1 combined atom of chlorine per double bond and a minor proportion of brominated isoolefin-multiolefin butyl rubber having at least about 0.5 weight percent combined bromine but not more than about 3 combined atoms of bromine per double bond.

2. A laminated structure according to claim 1 in which the highly unsaturated rubber is selected from the group consisting of natural rubber, rubbery diene-styrene copolymers and mixtures thereof.

3. A laminated structure according to claim 1 in which the second layer contains about 70-85% of chlorinated butyl rubber and about 15-30% of brominated butyl rubber.

4. A laminated structure according to claim 1 in which the second layer contains, per 100 parts by weight of total chlorinated and brominated butyl rubbers, about 0.1 to 100 parts by weight of a member selected from the group consisting of ZnO, CaO, MgO and mixtures thereof and about 0.05 to 5.0 parts by weight of an ultra-accelerator.

5. A laminated structure according to claim 1 which has been vulcanized by heating in the presence of added curatives at about 200° to 450° F. for between about 0.1 minute and 5 hours.

6. A vulcanizable composition adapted to become adhered to a highly unsaturated rubber comprising a major proportion of chlorinated isoolefin-multiolefin butyl rubber and a minor proportion of brominated isoolefin-multiolefin butyl rubber, said chlorinated butyl rubber having at least about 0.5 weight percent combined chlorine but not more than about 1 combined atom of chlorine per double bond and said brominated butyl rubber having at least about 0.5 weight percent combined bromine but not more than about 3 combined atoms of bromine per double bond.

7. A composition according to claim 6 containing per 100 parts by weight of total chlorinated and brominated butyl rubbers, about 2 to 100 parts by weight of ZnO, about 0.1 to 25 parts by weight of MgO, about 0.05 to 5.0 parts by weight of an ultra-accelerator, about 0.5 to 150 parts by weight of at least one light-colored filler, about 0.1 to 15 parts by weight of sulfur and about 0.2 to 3.0 parts by weight of a thiazyl sulfide.

8. A composition according to claim 7 which has been adhered to a highly unsaturated rubber-containing composition by heating at about 250° to 400° F. for about 1 to 60 minutes.

9. A tire containing as the sidewall thereof, a vulcanizate containing a major proportion of chlorinated isoolefin-multiolefin butyl rubber and a minor proportion of brominated isoolefin-multiolefin butyl rubber, said chlorinated butyl rubber having at least about 0.5 weight percent combined chlorine but not more than about 1 combined atom of chlorine per double bond and said brominated butyl rubber having at least about 0.5 weight percent combined bromine but not more than about 3 combined atoms of bromine per double bond.

10. The tire of claim 9 in which the sidewall contains, per 100 parts by weight of total chlorinated and brominated butyl rubbers, about 2 to 100 parts by weight of ZnO, about 0.1 to 25 parts by weight of MgO, and about 0.05 to 5.0 parts by weight of an ultra-accelerator.

11. In a rubber tire, a carcass containing a highly unsaturated rubber and a light-colored sidewall bonded thereto and containing a major proportion of chlorinated isoolefin-multiolefin butyl rubber and a minor proportion of brominated isoolefin-multiolefin butyl rubber, said chlorinated butyl rubber having at least about 0.5 weight percent combined chlorine but not more than about 1 combined atom of chlorine per double bond and said brominated butyl rubber having at least about 0.5 weight percent combined bromine but not more than about 3 combined atoms of bromine per double bond.

12. A process of producing a composite tire which comprises adhering to a carcass containing a highly unsaturated rubber a light-colored sidewall containing a major proportion of chlorinated isoolefin-multiolefin butyl rubber having at least about 0.5 weight percent combined chlorine but not more than about 1 combined atom of chlorine per double bond and a minor proportion of brominated isoolefin-multioolefin butyl rubber having at least about 0.5 weight percent combined bromine but not more than about 3 combined atoms of bromine per double bond.

13. In a process of producing a composite tire, the combination which comprises vulcanizing face to face with a highly unsaturated rubber carcass, at about 250° to 400° F. for about 1 to 60 minutes, a light-colored sidewall containing about 50–85% of chlorinated isoolefin-multiolefin butyl rubber and about 15–50% of brominated isoolefin-multiolefin butyl rubber, said chlorinated butyl rubber having at least about 0.5 weight percent combined chlorine but not more than about 1 combined atom of chlorine per double bond and said brominated butyl rubber having at least about 0.5 weight percent combined bromine but not more than about 3 combined atoms of bromine per double bond.

References Cited in the file of this patent

UNITED STATES PATENTS

| | | |
|---|---|---|
| 1,989,632 | Calvert | Jan. 29, 1935 |
| 2,240,856 | Phillips | May 6, 1941 |
| 2,720,479 | Crawford | Oct. 11, 1955 |
| 2,809,372 | Frederick | Oct. 8, 1957 |